F. G. WHITTINGTON.
AUTOMOBILE BUMPER.
APPLICATION FILED DEC. 24, 1920.
1,387,527.   Patented Aug. 16, 1921.
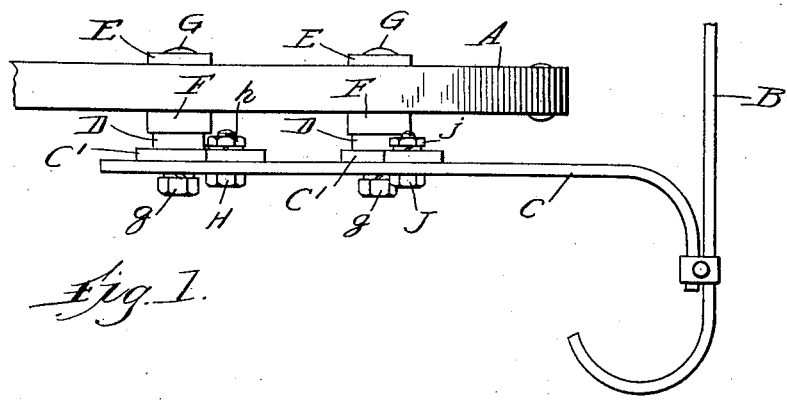
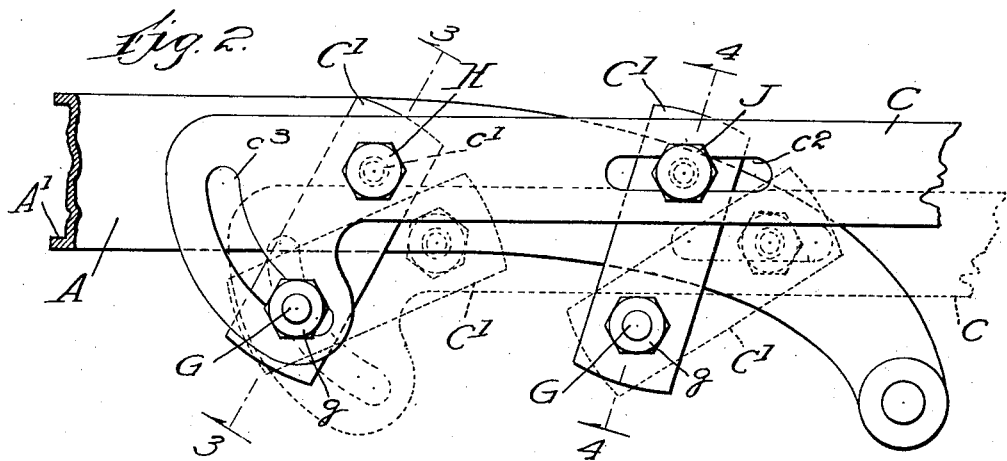
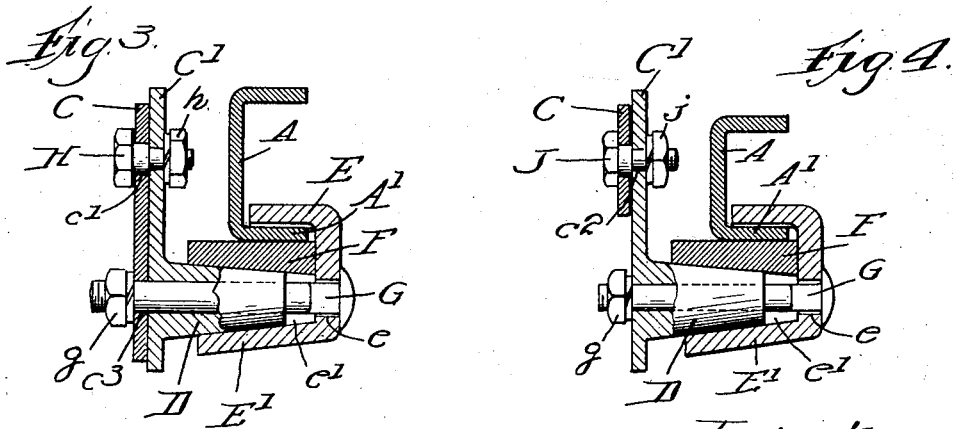
Inventor:
Frederik G. Whittington,
by Burton & Burton
his Attys.

UNITED STATES PATENT OFFICE.

FREDERIK G. WHITTINGTON, OF CHICAGO, ILLINOIS, ASSIGNOR TO STEWART-WARNER SPEEDOMETER CORPORATION, OF CHICAGO, ILLINOIS, A CORPORATION OF VIRGINIA.

AUTOMOBILE-BUMPER.

1,387,527.          Specification of Letters Patent.          Patented Aug. 16, 1921.

Application filed December 24, 1920. Serial No. 433,025.

*To all whom it may concern:*

Be it known that I, FREDERIK G. WHITTINGTON, a citizen of the United States, residing at the city of Chicago, in the county of Cook and the State of Illinois, have invented certain new and useful Improvements in Automobile-Bumpers, of which the following is a specification, reference being had to the accompanying drawings, forming a part thereof.

The purpose of this invention is to provide an improved construction of automobile bumper, particularly with respect to the means of mounting it by means of rearwardly extending supporting arms on the fore-and-aft side arms of the vehicle which it is to serve. It consists in the elements and features of construction shown and described as indicated in the claims.

In the drawings:

Figure 1 is a plan view of a portion of an automobile frame excluding one of the side arms and a portion of a bumper embodying this invention mounted thereon.

Fig. 2 is an outer side elevation of one of the vehicle side arms and the supporting arm of the bumper mounted thereon showing the securing devices.

Fig. 3 is a section at the line, 3—3, on Fig. 2.

Fig. 4 is a section at the line, 4—4, on Fig. 2.

In the drawings A represents one side arm of the vehicle which is to be served by the bumper. B is the bumper impact member. C is one of the rearwardly-extending bumper-supporting arms. The vehicle side bar, A, is of the usual channel bar form, and the mounting devices for the bumper are designed for attaching the bumper to the side arm by means of the lower flange of the channel side bar, A, as is most desirable for well understood reasons. The means for securing the bumper supporting arm, C, to the vehicle side bar, A, consists of two clamping devices, each of which comprises a bracket which consists of a frusto-conical stem, D, and arm, $C^1$, projecting transversely of said stem at one end thereof; a U-shaped clasp, E, having diverging arms, one of which is interiorly concaved as seen at $e^1$, on said arm, $E^1$, for fitting the frusto-conical stem, D, of the bracket; a coöperating member, F, one side of which is flat to seat on the lower surface of the flange, $A^1$, of the side bar, A, the other surface being concave to fit the frusto-conical stem, D, of the bracket, and a clamping bolt, G, which extends axially through the frusto-conical stem, D, and through the aperture, $e$, of the clasp, E, the head of the bolt being preferably at the clasp end, the nut, $g$, being applied at the opposite end for clamping the parts together, and thereby, it will be understood, clamping the bracket firmly to the lower flange, $A^1$, of the side bar, A. The bumper supporting arm, C, is clamped to the bracket, and thereby to the side bar, A, by the bolt, G, of the rear of the two clamping devices; and said supporting arm C, is definitely positioned and held with respect to both the clamping devices by engagement with the up-standing arms of said brackets respectively, at a distance from the clamping bolts, G, of the clamping devices, as seen at the bolts, H and J, which constitute these connections at the rear and forward brackets respectively. For the purpose of the connection described, a bumper arm, C, has a bolt hole at $c^1$, for the bolt, H, a longitudinal slot, $c^2$, for the bolt, J, and an arc slot, $c^3$, curved about the axis of the bolt hole, $c^1$, with a radius equal to the distance between the two bolts, G and H, of the rear clamping device. Preferably the bolts, H and J, are constructed with shoulders so that the bolts are clamped to the bracket by the nuts, $h$ and $j$, respectively, said shoulders being spaced from the heads of the bolts sufficiently to cause the bumper arms, C, to be free from clamping, being merely positioned on the bolts.

In mounting the bumper by means of the devices described, the clamping devices, being each first assembled as to their several parts with their bolts slack, will be engaged by the clasps with the lower flange of the side bar, A. The bumper arm will then be engaged by its arc slot, $c^3$, with the bolt, G, and the brackets being adjusted about the clamping bolt to bring the bolt holes for the bolts, H and J, into registration with the bolt holes, $c^1$ and $c^2$, respectively, of the bumper arm, C, the bolts, H and J, will be put in place and nuts applied. The bumper may now be adjusted to desired position as to height and as to fore-and-aft adjustment with respect to the vehicle wheels, the clasps being adjusted along the flange of the side bar, A, the brackets being inclined, the bolt, G, of the rear clamping device accommodating itself in the arc slot, and the bolt, J, accommodating itself in the longitudinal slot, $c^2$, as required in the positioning of the bumper, and all bolts being finally set tight by the respective nuts when the bumper is at desired position.

I claim:—

1. In combination with a bumper having a rearwardly extending supporting arm adapted to be applied laterally to a vehicle side bar, two similar clamping devices each comprising (a) a bracket consisting of a frusto-conical stem and an arm extending transversely therefrom at one end thereof, (b) a U-shaped clasp with diverging limbs for engaging the bracket with a flange of the vehicle side bar, one limb of said clasp being inwardly concave to fit the frusto-conical stem, and the other being adapted to lodge on the inner surface of the side bar flange; (c) a coöperating part having one side concaved to fit the bracket stem and the other flat for fitting on the outer surface of the side bar flange, and, (d) a clamping bolt extending through the bracket stem for forcing the U-clasp longitudinally of said stem, the bumper supporting arm being engaged by said bolt of one of the clamping devices, and a separate bolt engaging it with the bracket arm of the other of the clamping devices at a distance from said clamping bolt thereof.

2. The construction as defined in claim 1, foregoing, the first mentioned clamping device having a bolt hole in the bracket arm at a distance from the clamping bolt, the bumper supporting arm having a corresponding bolt hole and a bolt for connecting said two parts at said bolt holes; the bumper arm having an arc slot about the axis of said separate bolt whose radius is the distance apart of the clamping bolt and said separate bolt, the engagement of the bumper arm with the clamping bolt being at said arc slot.

3. The construction defined in claim 1, foregoing, the first mentioned clamping device having a bolt hole in the bracket arm at a distance from the clamping bolt, the bumper supporting arm having a corresponding bolt hole and a bolt for connecting said two parts at said bolt holes; the bumper arm having an arc slot about the axis of said separate bolt whose radius is the distance apart of the clamping bolt and said separate bolt, the engagement of the bumper arm with the clamping bolt being at said arc slot, the bumper arm having a longitudinally extending slot for engagement of the bolt by which said arm is connected to the bracket arm of the second mentioned clamping device.

4. The construction defined in claim 1, foregoing, the first mentioned clamping device having a bolt hole in the bracket arm at a distance from the clamping bolt, the bumper supporting arm having a corresponding bolt hole and a bolt for connecting said two parts at said bolt holes; the bumper arms having an arc slot about the axis of said separate bolt whose radius is the distance apart of clamping bolt and said separate bolt, the engagement of the bumper arm with the clamping bolt being at said arc slot, the bumper arm having a longitudinally extending slot for engagement of the bolt by which said arm is connected to the bracket arm of the second mentioned clamping device, the bolts which connect the respective bracket arms at a distance from the clamping bolts being shouldered for clamping them rigidly to the bracket arms without clamping the bumper arms.

In testimony whereof, I have hereunto set my hand at Chicago, Illinois, this 13th day of December, 1920.

FREDERIK G. WHITTINGTON.